(No Model.)
2 Sheets—Sheet 1.
A. VAN FLEET.
CHECK ROW ATTACHMENT FOR SEED PLANTERS.
No. 292,771.
Patented Jan. 29, 1884.
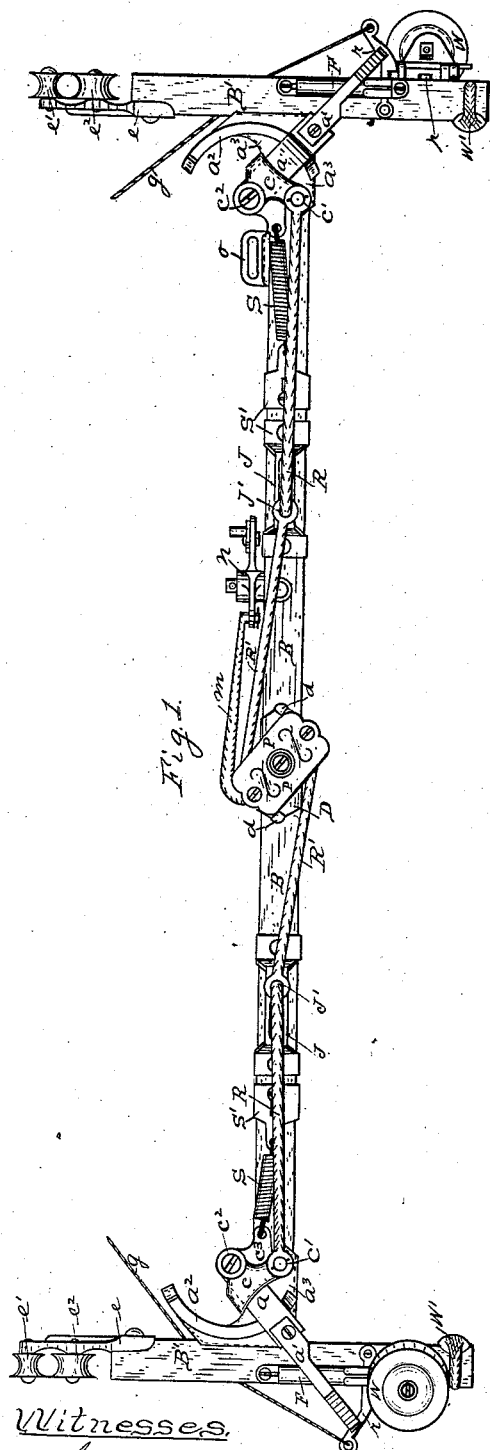
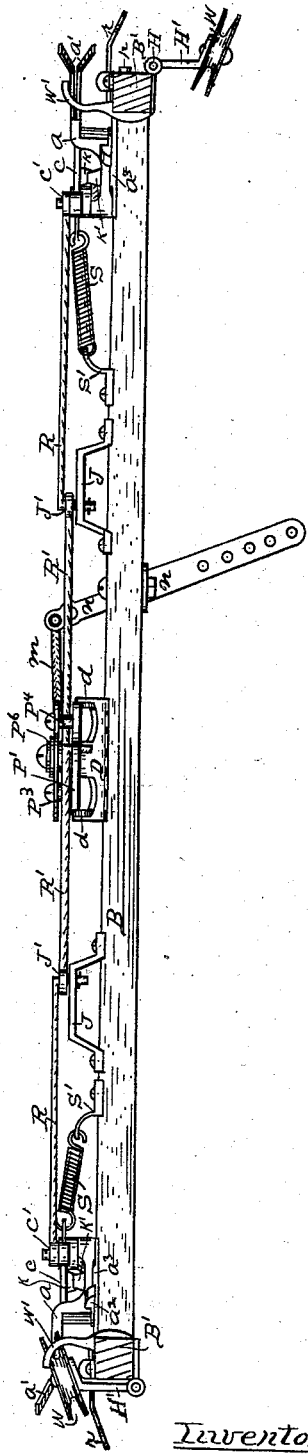
Witnesses.
Inventor.
Alfred Van Fleet.

(No Model.)
2 Sheets—Sheet 2.
A. VAN FLEET.
CHECK ROW ATTACHMENT FOR SEED PLANTERS.
No. 292,771.                               Patented Jan. 29, 1884.
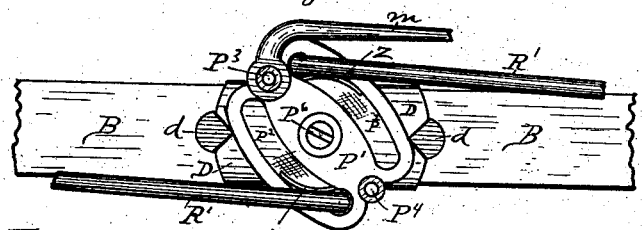
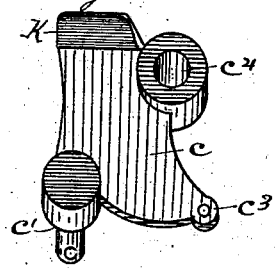
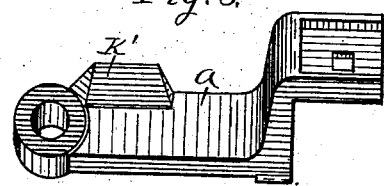
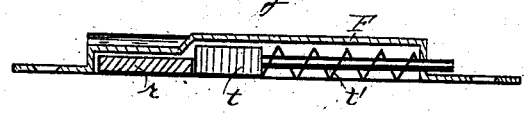
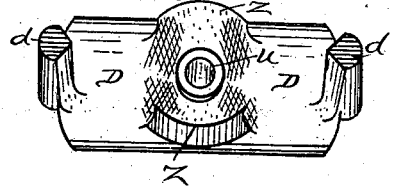
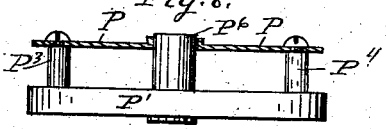
Witnesses,
Inventor,
Alfred Van Fleet.

United States Patent Office.

ALFRED VAN FLEET, OF JOLIET, ILLINOIS, ASSIGNOR TO ANDREW H. SHREFFLER, OF SAME PLACE.

CHECK-ROW ATTACHMENT FOR SEED-PLANTERS.

SPECIFICATION forming part of Letters Patent No. 292,771, dated January 29, 1884.

Application filed November 13, 1883. (No model.)

*To all whom it may concern:*

Be it known that I, ALFRED VAN FLEET, a citizen of the United States of America, residing at Joliet, in the county of Will and State of Illinois, have invented certain new and useful Improvements in Check-Row Attachments for Seed-Planters, of which the following is a specification, reference being had therein to the accompanying drawings.

Figure 1 is a plan view on the top; Fig. 2, a side elevation; Fig. 3, a plan view on the top of the central oscillating slotted plate; Fig. 4, a perspective view of the crank $c$; Fig. 5, a perspective view of the lever $a$; Fig. 6, a longitudinal sectional view of the barrel containing the coil-spring $t$; Fig. 7, a perspective view of the bed-plate supporting the oscillating plate P′, and Fig. 8 a side view of the oscillating plate P′ and a sectional view of its covering-plate P.

This invention relates to certain improvements in check-row attachments for seed-planters of that class in which the working parts are actuated by a knotted wire or cord stretched across the field passing between the tines of an oscillating forked lever, which improvements are set forth in the following specification and claims.

Referring to the drawings, B represents the main beam supporting the working parts of the device, and provided at either end with the cross-heads B′ B′, supporting the ordinary sheaves, $e'$ $e^2$, and a dump-sheave, $w$, to permit the check-row wire to be disengaged from the machine.

As each end of the device is alike a description of one will be sufficient.

The oscillating lever $a$ has attached to its outer end the flared tines $a'$ $a'$, between which the knotted wire stretched across the field is intended to pass, and is pivoted at its rear end to the top of the beam B by means of the stud $c^2$, and oscillates horizontally on the track $a^2$, having turned up ends to arrest it at either end of the track. When the forked lever is moved backward by means of a knot on the check-row wire to its farthest extremity, the knot will pass out of the forks or tines $a'$, when the forked lever will return by means of a coil-spring, S, attached to it, as shown in Figs. 1 and 2. The crank $c$ (shown in perspective in Fig. 4 on its bottom) is also pivoted by means of its hub $c^4$ on the stud $c^2$ with lever $a$. When lever $a$ oscillates, the lug $k'$ on its upper side (shown in Fig. 5) will engage with a corresponding lug, $k$, on lever $a$, and oscillate said crank $c$ with it. The crank $c$ is provided with a wrist-pin, $c'$, to which is pivoted the connecting-rod R. The opposite end of rod R terminates in a downwardly-projecting elbow, J′, which passes through an eye in the end of the connecting-rod R′, and also down through a slot in the upper face of the frame J, in which it traverses, as is shown in Figs. 1 and 2. The other end of rod R′ terminates in a downwardly-projecting elbow, which traverses the slot P² in the oscillating plate P′, (shown particularly in Fig. 3.)

The oscillating plate P′ rests on the bed-plate D (shown in perspective in Fig. 7) and oscillates upon the hub $u$ of said bed-plate either way until arrested by the posts $d$ $d$, as shown in Fig. 3. The central stud, P⁶, stands firmly in the beam B, and passes up through said bed-plate D, oscillating plate P′, and a covering-plate P, as shown in Fig. 8, which covering-plate rests on a pair of posts, P⁴, integral with plate P′. The bed-plate D is provided at either side with the elevated portions $z$. (Shown in Figs. 3 and 7.) These elevated sides form guides or barriers, behind which the end of the rod R′ hooks, so that when lever $a$ oscillates and pulls on rods R and R′, that rod R′ will not traverse the slot P² until it has oscillated said plate P′ as far as it will turn, when on the return of lever $a$ the rod R′ will then traverse slot P² and stand in the position shown in Fig. 3, ready for another move. Connecting-rod $m$ connects the plate P′ with the upper end of the drop-lever $n$, pivoted to the side of beam B, and to the lower end of which lever the seed-slide attaches.

In other machines of this class the guide-sides $z$ of plate D have been formed by cutting away the plate, forming a valley with a concave floor, up which floor the end of the rod R′ had to travel, which caused great friction on the end of the rod R′ and great uncertainty in its operation. In this device there is no friction or contact of said rod with said plate, except against the sides $z$, as they are elevated to be above the upper surface of plate D, as shown in Fig. 7.

Fig. 6 shows the device for catching and holding up the dump-sheaf frame H'. (Shown in Fig. 2.) Said frame is hinged to the side of the cross-head B' at H, so it can fall over as shown in said figure. When it is elevated as is shown at the left in Fig. 1, it is caught by the latch $r$, a cross-section of which is shown in Fig. 6. This latch $r$ is pivoted on the top of the cross-head, as shown in Fig. 1, and passes through between it and the barrel F in front of a plunger, $t$, so that the plunger presses constantly against it by means of the resiliency of the coil-spring $t'$, so that when the frame is thrown up the latch $r$ will catch and hold it up, as shown in Fig. 1. The cord $g$, attached to said latch, is for the purpose of releasing the latch, to permit the frame H' to fall over and disengage the check-row wire from the machine.

The new features in this device are as follows: First, the two connecting-rods R and R' being hinged together midway between the forked lever $a$ and the oscillating plate P', and having the slotted frame J to guide them at that point and steady them, as it is found one continuous connecting-rod reacting from the central oscillating plate to the forked lever is too yielding, and vibrates to such a degree it cannot be depended on for accurate work; second, the form of the bed-plate D, having the guide-sides $z$ formed by being elevated above the plane of the plate instead of being formed by hollowing out the plate or cutting away a portion of it to cause friction, as already stated; third, the device for latching the dump-frame H', (shown in Fig. 6;) fourth, the covering-plate P, for covering the slotted plate P', and having the stud P⁶ pass up through it, so the stud can be oiled without removing the plate.

The lever $a$ and crank $c$ are both pivoted on the stud $c^2$, and have their lugs $k$ and $k'$ so arranged with relation to each other that when the lever $a$ moves or oscillates, the said lug $k'$ of the lever $a$ will engage with the lug $k$ of the crank $c$, and by such engagement move the connecting-rods R and R' and oscillate the slotted plate P'. The principal benefit derived from the vertical sides $z$ of the bed-plate D is, that when the hooked end of the rod R' in the slot P² is caused to pull on the plate P', that they conduct the hook around, so it will not slide along in said slot without oscillating said plate P'; but when the plate P' has been oscillated to its full extent one way, the said hooked end of rod R' is caused to traverse the slot P² to the other end of the plate P' by means of the spring S, as it returns the lever $a$, crank $c$, and rods R and R'. It is in this backward movement of the rod R' that its hooked end is elevated by sliding up over the central portion of said plate D so the hook will fall over behind the opposite vertical side or offset, as shown in Fig. 3, as the slot in the oscillating plate is long enough to permit it so to do.

The connecting-rods R and R' are jointed together and arranged to traverse the slotted standard J for the further purpose of holding the rod R' on the standard J on a central working line with the oscillating plate P'. Otherwise, if a single connecting-rod were used, uniform motion could not be given the oscillating plate P', as the wrist-pin $c'$ of the crank $c$, to which said rod R is connected, does not in operation keep on a central working line with said slotted plate.

Having thus described my invention, what I claim as new, and desire to secure by Letters Patent, is as follows, to wit:

1. In the check-row attachment described, the combination of the forked lever $a$, jointed connecting-rods R and R', frame J, having a slot in its upper face to guide said levers, and slotted oscillating plate P', as and for the purpose set forth.

2. In the check-row attachment described, the bed-plate D, having the raised guide-sides $z$ $z$ formed thereon, as shown in Fig. 7.

3. In the check-row attachment described, the combination of the latch $r$, frame H', barrel F, plunger $t$, and coil-spring $t'$, as and for the purpose set forth.

4. The combination of the frame B, having the cross-heads B' B', forked lever $a$ $a'$, track $a^2$, crank $c$, coil-spring S, connecting-rods R R', slotted guide-frame J, slotted plate P', bed-plate D, having the elevated guide-sides $z$, and covering-plate P, as and for the purpose set forth.

ALFRED VAN FLEET.

Witnesses:
 WM. J. HUTCHINS,
 JOS. F. PERRY.